United States Patent [19]

Emmerson

[11] 3,963,368
[45] June 15, 1976

[54] TURBINE COOLING
[75] Inventor: Calvin W. Emmerson, Mooresville, Ind.
[73] Assignee: General Motors Corporation, Detroit, Mich.
[22] Filed: Dec. 19, 1967
[21] Appl. No.: 691,834

[52] U.S. Cl. ............................... 415/115; 415/116; 416/90 R
[51] Int. Cl.² ........................................... F01D 5/14
[58] Field of Search ....... 253/39.1 B, 39.1, 39.15 B, 253/77; 60/39.66; 415/115; 416/90

[56] References Cited
UNITED STATES PATENTS

| | | | |
|---|---|---|---|
| 2,743,579 | 5/1956 | Gaubatz | 60/39.66 |
| 2,879,028 | 3/1959 | Stalker | 253/39.15 |
| 2,956,773 | 10/1960 | French | 253/39.15 |
| 2,997,275 | 8/1961 | Bean et al. | 253/78 |
| 3,088,281 | 5/1963 | Soltau et al. | 60/39.65 |
| 3,246,469 | 4/1966 | Moore | 253/39.15 |
| 3,301,527 | 1/1967 | Kercher | 253/39.15 |

Primary Examiner—Samuel Feinberg
Attorney, Agent, or Firm—Paul Fitzpatrick

[57] ABSTRACT

A cooling arrangement for high temperature turbines, particularly the first stage nozzles of gas turbine engines. Cooling is effected by compressor discharge air taken from the combustion chamber jacket of the engine. The shrouds of the nozzle have a base ring and a porous facing spaced from the base ring and exposed to the motive fluid. Cooling air fed through openings in the base ring flows through the porous facing into the motive fluid path to cool the facing by transpiration. The vanes are cooled by an arrangement providing for a mixture of impingement and transpiration cooling. Compressor discharge air is admitted between a baffle in the interior of the hollow vane and the high pressure face of the vane. Some of the air flows through the porous high pressure face for transpiration cooling. The rest of the air is discharged through a row of openings in the baffle to impinge on and cool the interior of the leading edge of the vane, which is imperforate. This air then circulates rearwardly of the vane and exhausts through the porous low pressure face of the blade.

7 Claims, 12 Drawing Figures

INVENTOR.
Calvin W. Emmerson
BY
Paul Fitzpatrick

U.S. Patent   June 15, 1976   Sheet 2 of 3   3,963,368
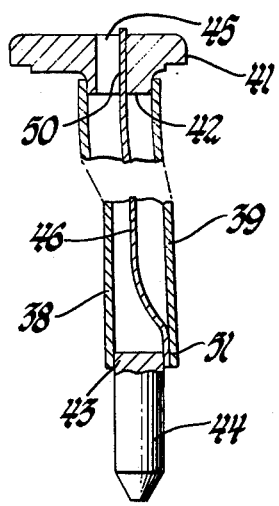
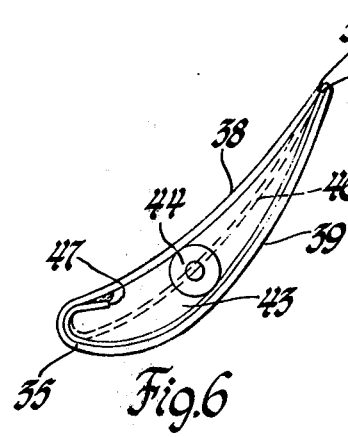
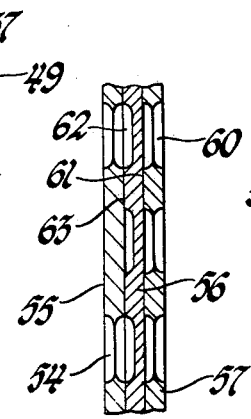
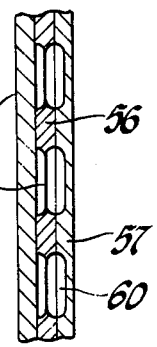
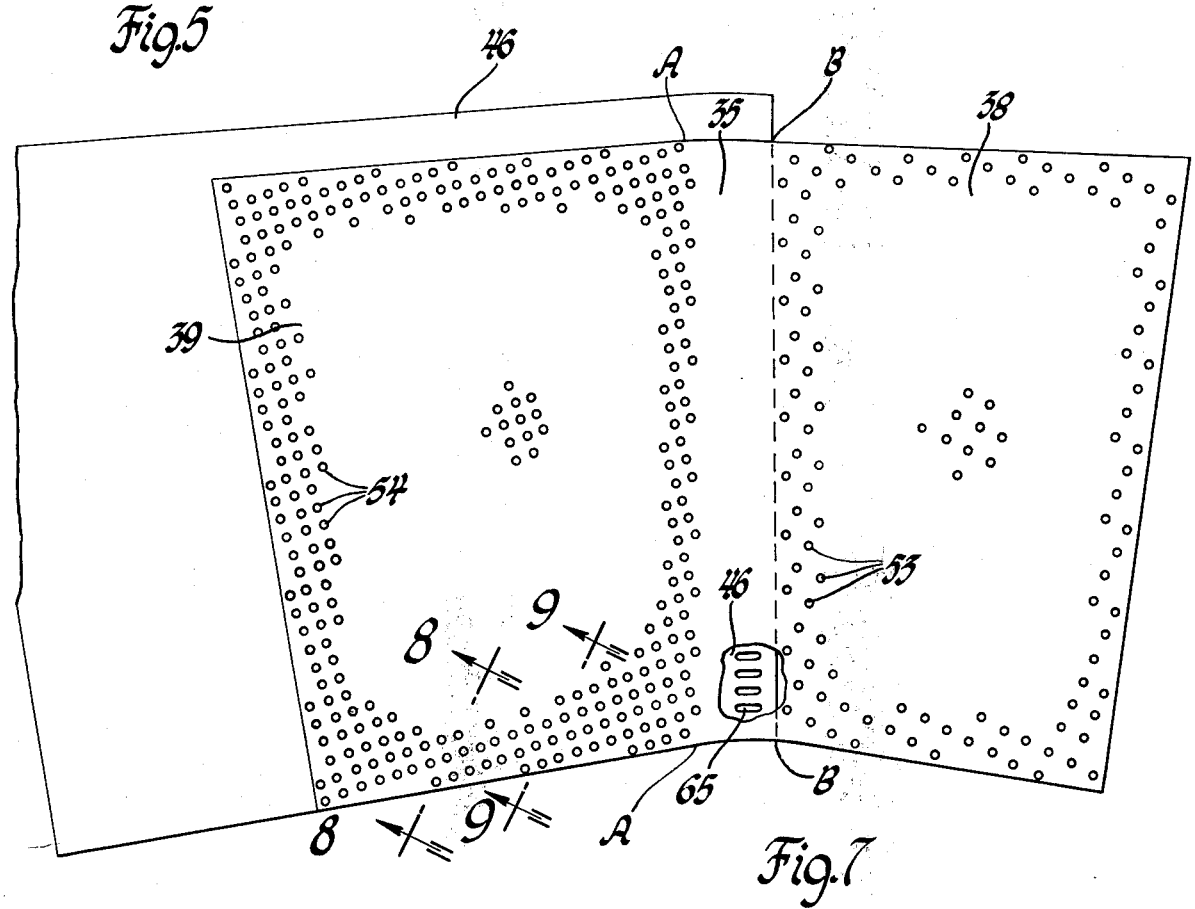
INVENTOR.
Calvin W. Emmerson
BY
Paul Fitzpatrick U.S. Patent   June 15, 1976   Sheet 3 of 3   3,963,368

INVENTOR.
Calvin W. Emmerson
BY
Paul Fitzpatrick
ATTORNEY

TURBINE COOLING

The invention herein described was made in the course of work under a contract or subcontract thereunder with the Department of Defense.

My invention relates to the cooling of turbomachinery, and particularly to the cooling of the hot parts of high-temperature turbines of gas turbine engines. It has long been recognized that improvements in the efficiency, specific volume, and specific weight of gas turbines may be realized by increasing the turbine inlet temperature. Because of limitations of available materials, higher ranges of turbine temperatures are obtainable only by some sort of turbine cooling. A preferred method of cooling the turbine is by use of cooling air diverted from the compressor of the engine, directly or indirectly. It is most important that such cooling air be used efficiently, since bleeding air from the compressor in itself has a strong detrimental effect on the efficiency and power output of the engine.

Various types of cooling arrangements for turbine nozzle shrouds, vanes, rotor wheels, blades, and other extremely hot parts of the engine are known. For example, there is convection cooling, in which the cooling air circulates through the inside of a hollow vane or other structure parallel to its surface. There is impingement cooling, in which the air is blown head-on toward the hot interior surface. There is film cooling, in which the air is fed through openings in the vane or other part so as to flow along the outer surface and isolate the part considerably from the hot motive fluid. Also, there is transpiration cooling, in which the skin of the body is porous and is cooled by air or other cooling substance flowing through the pores from the inside to the outer surface of the body. It is possible to use liquids for transpiration cooling, but this is not feasible as a general proposition in aircraft turbines. Some discussion of such cooling principles can be found in A.S.M.E. paper 65-WA/GTP-10 "Analysis and Testing of Air-Cooled Turbine Rotor and Stator Vanes" by Helms and Emmerson.

Of all the various cooling methods, convection cooling is the simplest, but least effective in terms of the amount of cooling achieved by a given circulation of air. Impingement cooling is considerably more effective, film cooling somewhat more effective than impingement cooling, and transpiration cooling most effective of all. However, transpiration cooling requires a source of air or other coolant at a pressure higher than the pressure external to the vane, face, or other surface through which the air must diffuse. This creates a problem, particularly in the first stage nozzles of gas turbine engines in which the pressure of the motive fluid entering the nozzle is substantially the same as that of the air discharged from the compressor of the engine, the difference being due to the slight pressure drop due to flow in the combustion apparatus. This makes it difficult to use compressor discharge air for cooling in the most efficient manner unless some auxiliary means is used to raise the pressure. This, of course, is extremely undesirable as adding complications to the engine and consuming energy.

It may also be noted that the hottest part of a nozzle vane is the leading edge, and at this point the vane is exposed to full pressure of the motive fluid. As the motive fluid accelerates past the vane, its pressure decreases, and most rapidly on the convex or low pressure side of the vane. So far as the nozzle shrouds are concerned, the velocity of flow past them lowers the static pressure and makes transpiration cooling feasible.

Briefly summarized, the principle of my invention lies in using transpiration cooling for the shrouds of the turbine nozzle and using a combination of impingement and transpiration cooling for the vanes. Impingement cooling is used for the leading edge, with the air which has impinged against the inner surface of the leading edge of the vane flowing through the vane, absorbing some heat by convection and then flowing through the porous surface of the vanes to cool by transpiration. Depending upon the turbine stage, the air used for impingement cooling may discharge only through the low pressure face of the vanes, or it may discharge through both faces. In some cases, there may be an excess of cooling air required for leading edge cooling above what may conveniently be discharged through the porous wall of the vane, in which case some of the cooling air may be discharged through suitable openings in the trailing edge of the vane according to prior practice. My invention is particularly suited to turbines with motive fluid temperatures in the range above 2500°F.

Specific structures to facilitate the practice of the invention will be explained in the succeeding detailed description of the preferred embodiment of the invention. The nature and advantages of the invention will be clear to those skilled in the art from this description.

The principal objects of my invention are to improve the efficiency and utility of gas turbine engines by providing for higher operating temperatures of such engines, to provide improved means for cooling the hot parts of gas turbine engines, particularly turbine nozzles, and to provide an improved structure combining the advantages of, and creating a cooperative relationship between, impingement and transpiration cooling in gas turbine engines. A further object is to improve the abrasion resistance of cooled blades.

Referring to the drawings,

FIG. 5 is a vertical sectional view of the vane taken on the plane indicated by the line 5—5 in FIG. 3.

FIG. 6 is a view of the radially inner end of the vane.

FIG. 7 is a view of the vane facing and baffle before forming.

FIG. 8 is a fragmentary sectional view taken on the plane indicated by the line 8—8 in FIG. 7.

FIG. 9 is a fragmentary sectional view taken on the plane indicated by the line 9—9 in FIG. 7.

Figure 1:
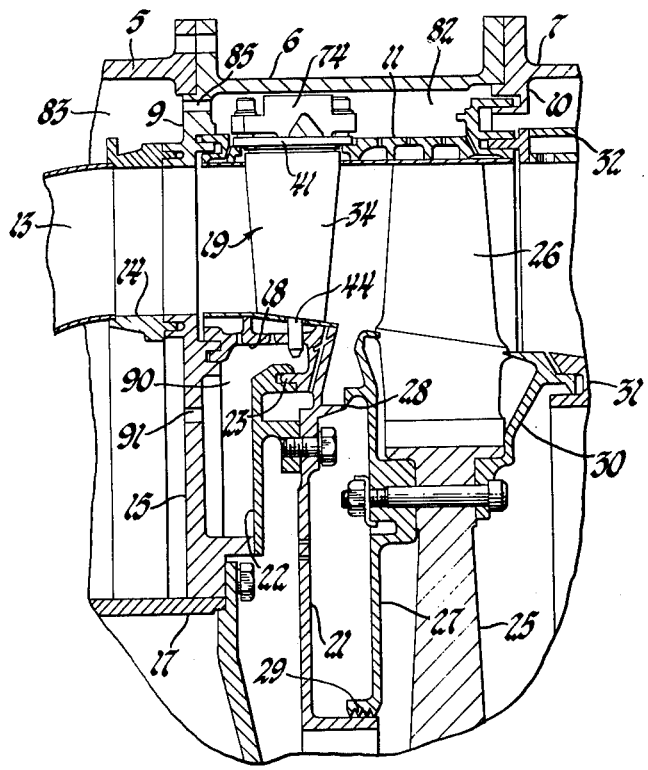
FIG. 1 is a partial sectional view of a single stage turbine of a gas turbine engine, the view being taken on a plane containing the axis of rotation of the turbine.
Figure 3:
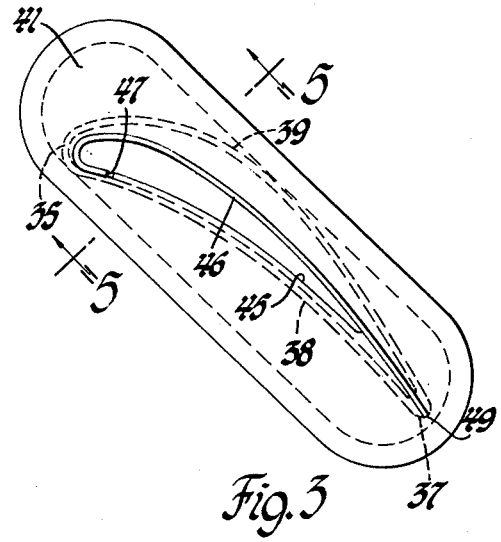
FIG. 3 is a view of the radially outer end of a nozzle vane.

Referring first to FIG. 1, there is shown a turbine of a gas turbine engine which may include the usual compressor, combustion apparatus fed by the compressor, and turbine energized from the combustion products from the combustion apparatus coupled to drive the compressor. Such an engine may be a jet engine or may drive a shaft or otherwise deliver power, depending upon the desired service. U.S. Pat. No. 3,332,242 of Johnson illustrates such a gas turbine. Only the turbine and adjacent parts of the engine in which the invention is incorporated are illustrated here. The engine may include an outer casing provided in series by a compressor casing (not illustrated), a combustion section case 5, a turbine case 6, and an exhaust duct casing 7, these being bolted together at circumferential flanges. The turbine case 6 has an inwardly directed flange 9 at its forward end and the exhaust duct has an inwardly directed flange 10 at its forward end.

The outer shroud 11 of the turbine nozzle is mounted on these flanges by a tongue-and-groove joint providing freedom for relative axial expansion of the parts. The turbine nozzle may be divided into segments circumferentially of the engine. The engine is provided with a preferably annular combustion chamber 13 with an outlet 14 piloting onto the flange 9 and onto an inner support 15 aligned axially of the engine with flange 9. Support 15 is coupled to an engine shaft housing 17. The inner shroud 18 of the turbine nozzle has a tongue-and-groove pilot onto the inner support 15. A row of turbine nozzle vanes 19 extends between the shrouds 11 and 18.

The turbine nozzle inner shroud 18 is integral with a diaphragm 21 to which is bolted a ring 22 having a tongue-and-groove engagement with a flange 23 (FIG. 2) on the diaphragm. A turbine wheel 25 concentric with the turbine nozzle mounts blades 26, the tips of which are adjacent to the rear portion of the outer shroud 11. A seal ring 27 bolted to the forward face of the turbine wheel provides labyrinth type seals at 28 and 29 with the diaphragm 21. A seal ring 30 bolted to the rear face of the turbine wheel provides labyrinth seal with the forward edge of the inner exhaust cone or inner exhaust duct wall 31. The exhaust duct has a cooled outer wall 32 which has a tongue-and-groove engagement with the rear edge of the outer shroud 11.

Referring to FIGS. 2, 3, 4, 5, and 6 for the structure of the nozzle vanes, each vane is a separate welded or bonded assembly mounted in the outer and inner shrouds. Each vane 19 comprises four parts. One is a folded sheet of porous metal defining the facing or airfoil portion 34, which has a leading edge at 35, a trailing edge at 37, a concave or high pressure face 38, and a convex or low pressure face 39. The vane includes a base 41 with a boss 42 which fits within the outer end of the airfoil. The vane also includes a plug 43 closing the radially inner end of the vane, from which a spigot 44 projects into the inner shroud 18. These three parts provide a hollow airfoil with means for supporting it and connecting it to the inner and outer nozzle shrouds. The base 41 defines an arcuate opening 45 for cooling air, the shape of which is clearly shown in FIG. 3.

The vane also includes an impervious sheet metal baffle or air directing member 46. This is a curved sheet which is electron-beam welded, spot-welded, or diffusion bonded to the inside of the concave face of the blade near the leading edge along the baffle edge indicated by 47. From this point it curves backwardly and follows approximately the mid-chord of the vane, terminating at the trailing edge 49 where it is welded or bonded between the two faces of the airfoil portions. A portion of the baffle projects through the opening 45 as indicated at 50 in FIG. 5, and the radially inner end of the baffle is fitted between the plug 43 and the convex wall 39 as indicated at 51. The rear edge of the baffle is trimmed off at the trailing edge. The airfoil 34, the base 41, the plug 43, and the baffle 46 are all united into a single structure by suitable processes such as welding, which may be electron-beam welding, diffusion bonding, or any other suitable process. It is highly desirable to provide a strong, high temperature resistant, substantially leak-proof seam around the junctions between the base and plug and the walls of the airfoil, as well as at the trailing edge, unless it is desired to have some of the cooling air escape through the trailing edge. Likewise, in the embodiment of the invention shown in FIG. 4, it is preferred that the seam between the baffle and the concave face 38 be substantially air-tight, although minor leakage is not of great consequence.

Figure 11:
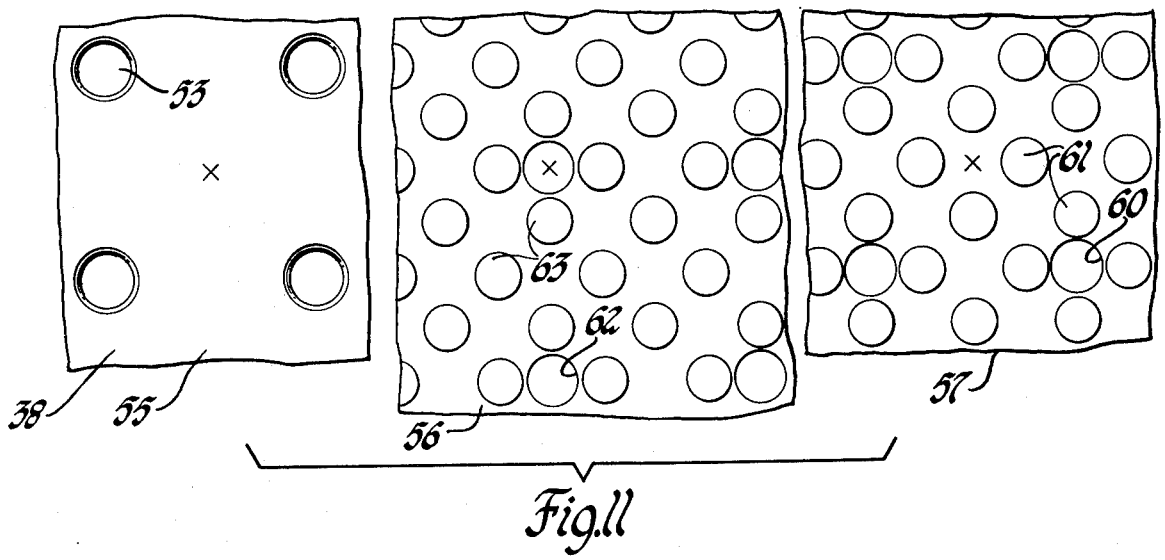
FIG. 11 is an exploded view illustrating three layers of a laminated metal sheet on the concave side of the blade.
Figure 12:
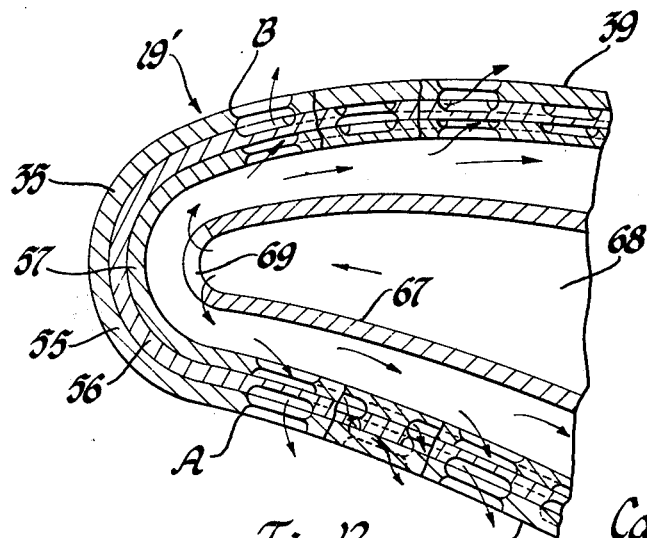
FIG. 12 is a partial cross-sectional view of a vane or blade illustrating a modified structure.

The airfoil portion or facing 34 of the blade is formed from sheet material which is of a controlled porosity over most of the area, only the leading edge portion being impervious, This is shown most clearly in FIG. 12 in a somewhat different airfoil from that of FIGS. 3 to 11, which, however, has the same sort of leading edge. In FIG. 12, the demarcation between the leading edge 35 and the faces 38 and 39 may be considered to be along the lines indicated as A and B in that figure. The ends of the lines A and B are also indicated in FIG. 7.

For the most successful use of my invention, it is important that the blade facing be of a material having a well-controlled degree of porosity. Efforts have been made to provide porous high temperature materials by sintering layers of wire, mesh, or ribbon. Examples of disclosures related to this type of activity are found in U.S. Pat. Nos. 2,857,657; 3,011,760; 3,067,982; and 3,095,283. However, these prior art efforts have not provided good control of porosity or high tensile strength and modulus of elasticity. While such materials might be used in carrying out my invention, I prefer to use a porous material of the sort disclosed in the U.S. patent application of Bratkovich and Meginnis, Ser. No. 526,207, filed Feb. 9, 1966, for Laminated Porous Metal, of common ownership with this application. The drawings of my application illustrate, to the extent needed to understand my invention, a form of laminated porous metal according to the Bratkovich and Meginnis invention.

Referring particularly to FIG. 7 which shows the blade facing and baffle before forming into the airfoil, the leading edge portion 35, the concave face portion 38, and the convex face portion 39 are indicated. Also, the sheet 46 which provides the baffle. A number of closely spaced pores 53 are indicated in the concave face and a number of still more closely spaced pores 54 in the convex face. The blade facing comprises (see FIGS. 8 to 12) an outer layer 55, an intermediate layer 56, and an inner layer 57. The three layers are machined in such a way as to provide passages extending in a tortuous manner from the inside to the outside of the laminated blade facing. Considering first FIG. 10, the inner layer has holes 60 and is provided with bosses 61 between which cooling air can flow to holes 62 in the intermediate layer 56, which also has bosses identified as 63 on its outer surface. Thus, cooling air can enter the laminated material through holes 60, flow between bosses 61, through holes 62, between bosses 63, and out through pores 54. The three fragmentary views in FIG. 10 all display an *x* which indicates a point of registry of the three layers. As will be apparent, the holes in the inner and outer layers are in registry and the holes in the intermediate layer are out of register with these.

Referring to FIG. 11, the concave face is of similar structure, but with more widely spaced holes to provide a lower degree of perviousness and thus, for the same pressure differential, a lower air flow. In FIG. 11, the holes and bosses on the inner and intermediate layers are numbered the same as in FIG. 10 but, as will be apparent, there are only half the number of holes in all three layers as are present in FIG. 10. The size of the bosses and the depth of the machining between the bosses, as well as the size and spacing of the holes, will determine the perviousness of the material. By virtue of the nature of the circulation through the facing, the transpiration cooling is highly effective.

Figure 4:
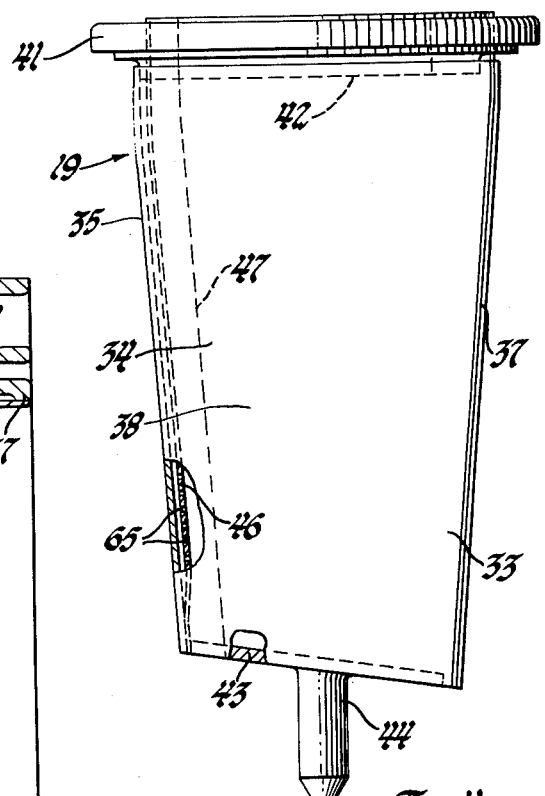
FIG. 4 is an elevation view of the vane.
Figure 10:
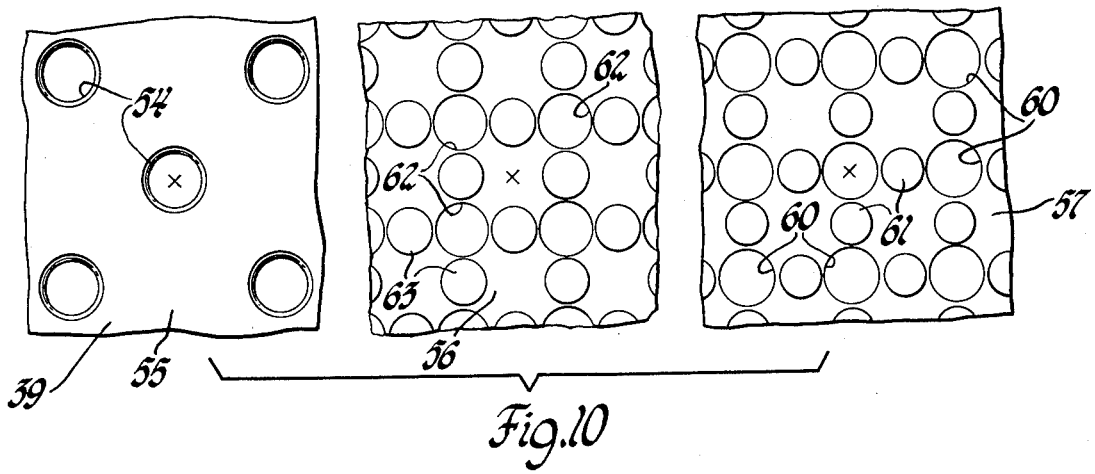
FIG. 10 is an exploded view illustrating three layers of a laminated metal sheet on the convex face of the blade.

The leading edge portion 35 is cooled by air jetted from a row of slots 65 in the portion of baffle 46 which lies immediately behind the leading edge of the blade, as shown in FIGS. 4 and 7. Since this portion of the blade facing is imperforate, the cooling air does not have to buck the entire static or stagnation pressure of the motive fluid. This cooling air, the pressure of which has been lowered by flow through the slots 65, then diffuses through the porous wall of the convex or low pressure face 39 of the blade. The concave face, which is subject to a higher general level of motive fluid pressure, receives its cooling air directly from the space between the baffle and the blade wall, which is at full compressor discharge pressure.

It is not essential in all cases that there be a different pressure on the two faces of the blade. FIG. 12 illustrates a vane or blade 19' with a baffle 67 which is similar to the baffle 46 except that it is spaced from both faces of the blade to define an air inlet tube 68. The baffle may or may not extend to the trailing edge, as desired. Air flows from baffle 67 against the blade leading edge through a row of slots 69 similar to slots 65, from which it can flow toward the trailing edge of the blade between the baffle and both faces of the blade. The structure shown in FIG. 12 might be preferred in a turbine blade or in a nozzle of a second or later stage of a turbine, if cooling of the sort described herein is desired in the stages after the first. FIG. 12 also illustrates the tortuous flow of the transpiration cooling air through the laminated faces of the blade.

Figure 2:
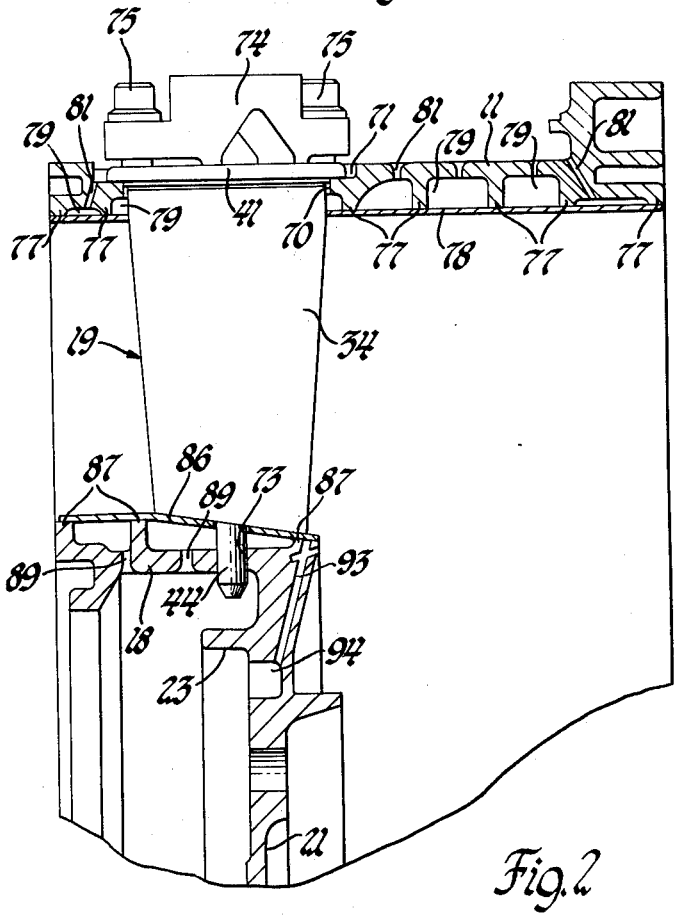
FIG. 2 is an enlarged view of the turbine nozzle portion of the same.

We may now consider the mounting of the vanes 19 on the nozzle shrouds 11 and 18. Referring to FIG. 2, the outer shroud 11 has a ring of blade-shaped holes 70, each blade extending through one hole. A flat-surfaced recess 71 is machined around each of the holes, the laterally extending vane base 41 fitting against the bottom of recess 71. The spigot 44 on the radially inner end of each vane extends into a round hole 73 in the inner shroud 18. The vane is held in place by a block 74 which engages the outer surface of base 41, bridges the air inlet 45, and is held down by two cap screws 75 threaded into the outer shroud. It will be understood that the blades stagger in one direction relative to the axis of the engine and the blocks 74 in the other direction.

So far as my invention is concerned, any desired means for retaining the vanes may be employed. Also, the piloting of the inner ends of the vane in the inner shroud is an optional feature. However, the present construction provides for easy fitting and removal of the vanes or replacement or repair of other parts of the nozzle.

Proceeding now to the arrangement for cooling the faces of the nozzle shrouds which are exposed to the hot motive fluid, with reference to FIG. 2, the outer shroud 11 bears a number of circumferential ridges 77. A facing sheet 78 of pervious material, such as that employed for the vane facing, or any other suitable pervious material, is fixed to the inner faces of the ridges 77 by a suitable process such as electron-beam welding. The structure thus defines a number of circumferential chambers 79 between the shrouds 11 and the pervious facing 78. Each chamber 79 is supplied with cooling air through radial passages 81 in the wall of the outer shroud. These radial passages communicate with a plenum chamber 82 (FIG. 1) between the turbine case 6 and the outer shroud. This plenum chamber is supplied with compressor discharge air at full pressure from the combustion chamber jacket 83 through a ring of air holes 85. Thus, the flow of cooling air to successive zones of the facing 78 axially of the turbine may be controlled by metering flow to each individual chamber 79 through its supply passages 81 to achieve the desired pressure within the chamber 79. The degree of perviousness of the facing may be varied along the axis of the facing 78 if desired. It is desirable, of course, to control the flow of air so as to obtain the desired temperature along the length of the facing 78 without undue use of the cooling air. The pressure within the motive fluid path decreases downstream in the turbine so that the pressure differential available for cooling increases. This can be taken into account in the design of a pervious facing or in the proportioning of the supply passages 81.

The inner shroud 18 has a pervious facing 86 similar to facing 78 and mounted on circumferential ridges 87 on the inner shroud. The chambers between the shroud and the facing are supplied with air for cooling through passages 89 from a plenum 90 (FIG. 1) between the inner support 15 and the ring 22. This is supplied with air from the combustion chamber jacket through holes 91 in the support 15. As before, the rate of supply of air to each zone and the perviousness of the facing may be tailored to suit the conditions of operation.

The interior of vanes 19 is supplied through air openings 45 from plenum 82.

FIG. 2 illustrates one of an annular array of passages 93 in the rear edge of inner shroud 18 for directing cooling air to the base of turbine blades 26. These are supplied with cooling air from a recess 94 in the forward face of the diaphragm which receives the cooling air from any suitable source.

It will be clear to those skilled in the art from the foregoing that my invention provides a very efficient, flexible, and practical means for cooling the hot parts of a turbine to secure as near as feasible uniform acceptable temperatures with maximum economy in the use of cooling air. Particularly in the critical first-stage nozzle of a high temperature turbine, the cooperation between cooling by transpiration of air supplied directly at compressor discharge pressure, impingement cooling by air discharged from an area containing the air at compressor discharge pressure, and transpiration cooling of the low pressure face of the vane by the air after throttling through the nozzles for the impingement cooling provides an extremely desirable and effective means of vane cooling.

If the flow of air required to cool the leading edge is more than is desired for cooling the convex vane face, some may be exhausted through openings at the trailing edge. The imperforate leading edge resists abrasion more effectively than a porous or perforated leading edge.

The detailed description of preferred embodiments of the invention for the purpose of explaining the principles thereof is not to be considered as limiting or restricting the invention, since many modifications may be made by the exercise of skill in the art without departing from the principles of the invention.

I claim:

1. A gas turbine comprising, in combination, means for supplying a hot motive fluid under pressure, means for supplying a cooling fluid at a supply pressure substantially the same as the pressure of the motive fluid, a turbine nozzle including an outer shroud and an inner shroud defining between them a path for the said motive fluid, the nozzle including a ring of vanes extending from one shroud to the other, and means for cooling surfaces of the nozzle exposed to the motive fluid by the said cooling fluid including a facing of sheet metal of controlled perviousness to fluid defining the said surfaces having closely spaced extensively distributed pores through the facing portions so exposed; means for conducting the cooling fluid from the said source to the facing to flow through the facing, the conducting means including means for delivering the cooling fluid to a portion of the facing at a lower pressure below the supply pressure of the cooling fluid delivered to another portion of the facing, consonant with variations in pressure of the motive fluid exerted against diverse portions of the facing; and means for employing the drop in pressure of the fluid from the supply pressure to the lower pressure to energize cooling fluid jets for impingement cooling of a portion of the nozzle.

2. A turbine as recited in claim 1 in which the said surfaces include the surfaces of the nozzle shrouds exposed to the motive fluid.

3. A turbine as recited in claim 1 in which the portion of the nozzle cooled by impingement is the leading edge portions of the vanes.

4. A gas turbine comprising, in combination, means for supplying a hot motive fluid under pressure, means for supplying a cooling fluid at substantially the same pressure as the motive fluid, a turbine nozzle including an outer shroud and an inner shroud defining between them a path for the said motive fluid, the nozzle including a ring of vanes extending from one shroud to the other, and means for cooling surfaces of the nozzle shrouds exposed to the motive fluid by transpiration of the said cooling fluid including a facing of sheet metal of controlled perviousness to fluid defining the said shroud surfaces, the facing having closely spaced pores distributed over substantially the entire area of the facing which is exposed to flow of motive fluid between the vanes; means for conducting the cooling fluid from the said source to the facing to flow through the facing, the conducting means including means for supplying the cooling fluid to a portion of the facing at a pressure below that of the cooling fluid supplied to another portion of the facing, consonant with variations in pressure of the motive fluid exerted against diverse portions of the facing.

5. A turbine stage comprising, in combination, an outer shroud, an inner shroud, vanes extending radially between the shrouds, and a turbine wheel including blades downstream of the vanes and extending adjacent to the outer shroud; the outer shroud including a base ring and a porous facing spaced radially inward from the base ring, the inner shroud including a base ring and a porous facing spaced radially outwardly from the base ring, the vanes extending from one shroud ring and to the other shroud ring; the porous facings having closely spaced pores distributed over substantially the entire area of the facing which is exposed to flow of motive fluid between the vanes; and means for supplying a cooling fluid between each base ring and the corresponding facing for discharge through the porous facing externally of the vanes to cool the facing by transpiration of the cooling fluid.

6. A turbine stage as recited in claim 5 in which the last-recited means includes a plenum chamber, a plurality of chambers between the base ring and facing, and fluid metering passages between the plenum chamber and the said plurality of chambers.

7. A cooled airfoil for use in a high-temperature turbomachine comprising, in combination, a skin contoured to define a higher pressure face, a lower pressure face, and a leading edge portion joining the faces, the faces extending to the trailing edge of the airfoil, the faces having closely spaced pores distributed over substantially the entire area of each face so as to be permeable to fluid flow through the faces for transpiration cooling and the leading edge portion being impermeable, a baffle within the skin disposed between the two faces, an entrance for cooling fluid disposed between the baffle and the higher pressure face, and a row of outlets through the baffle adjacent to and directed toward the said leading edge portion to cool the leading edge portion by impingement of the cooling fluid against the interior thereof, the permeable faces providing for diffusion of the fluid through the faces for cooling the faces by transpiration.

* * * * *